March 16, 1926.
W. P. WITHEROW
1,577,430
DIE ROLLED ARTICLE AND METHOD OF MAKING THE SAME
Filed Jan. 20, 1922  2 Sheets-Sheet 1
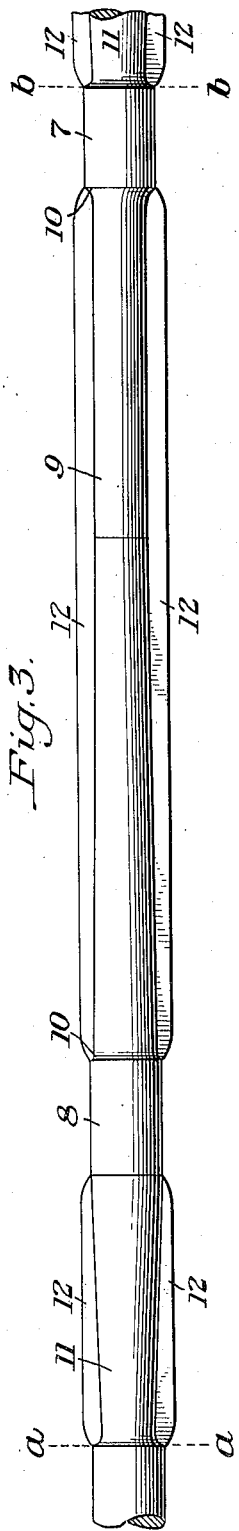
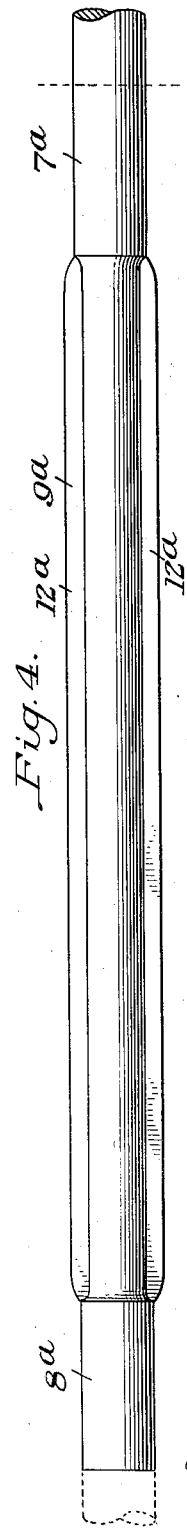
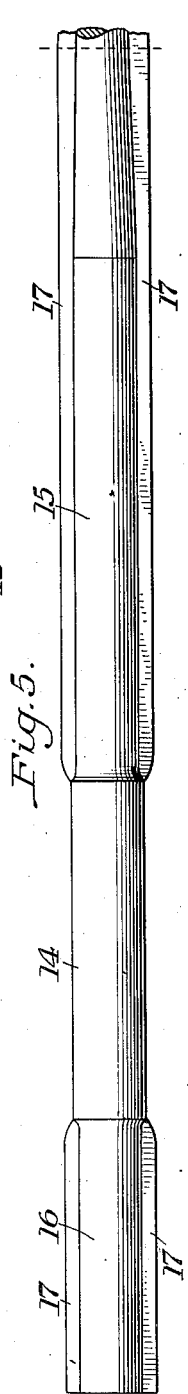
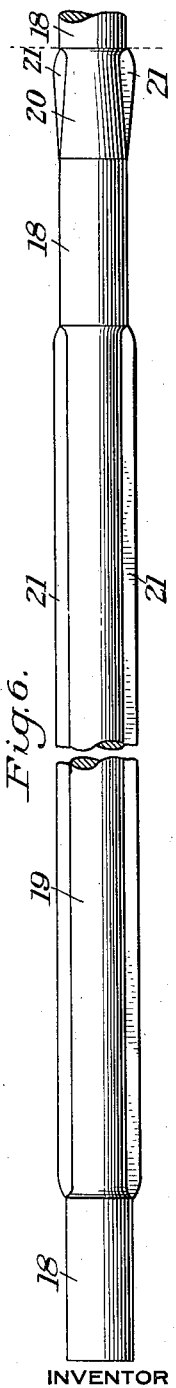
INVENTOR Patented Mar. 16, 1926.

1,577,430

UNITED STATES PATENT OFFICE.

WILLIAM P. WITHEROW, OF PITTSBURGH, PENNSYLVANIA, ASSIGNOR TO WITHEROW STEEL COMPANY, A CORPORATION OF PENNSYLVANIA.

DIE-ROLLED ARTICLE AND METHOD OF MAKING THE SAME.

Application filed January 20, 1922. Serial No. 530,640.

*To all whom it may concern:*

Be it known that I, WILLIAM P. WITHEROW, residing at Pittsburgh, Allegheny County, Pennsylvania, have invented a new and useful Improvement in Die-Rolled Articles and Methods of Making the Same, of which the following is a full, clear, and exact description, reference being had to the accompanying drawings, forming part of this specification, in which—

Figure 1 is a cross-section of one form of leader or shape from which the articles may be rolled;

Figure 2 is a similar view of a slightly modified form of leader or shape;

Figure 3 is a side elevation showing one of the drive shaft blanks as rolled, with part of another, the whole being part of the entire rolled length;

Figures 4 and 5 are views similar to Figure 3 illustrating modified forms of drive shafts;

Figure 6 is a view similar to Figure 3 illustrating a drive shaft more particularly adapted for use as a propeller shaft;

Figure 7:
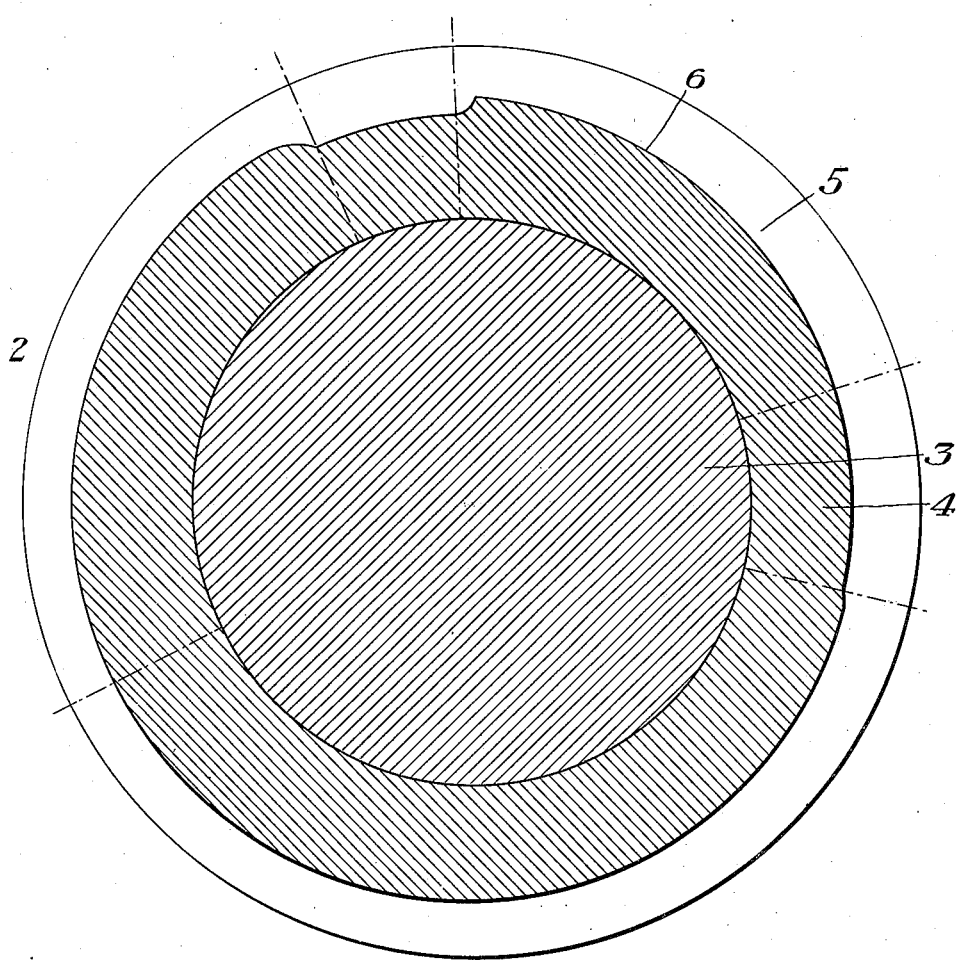
Figure 7 is a cross-section of one of the die rolls employed.

The present invention relates broadly to the manufacture of shafts or axles subjected to torsional strains, and more particularly to power shafts such as live drive shafts serving as rear axle shafts or as propeller shafts for automobiles, and is designed to provide a new and improved method for making the same, together with a new blank or product produced thereby. The expression drive shaft when used herein is definitive not only of the rear axle drive shafts which transmit power from the differential to the rear wheels, but also of the propeller shafts adapted for transmitting power from the transmission casings to the differential housings, and to axles generally which are used under such conditions as to subject them to torsion.

Heretofore shafts of this nature have been taper rolled by eccentric rolls, have been turned individually, or forged singly to give the varying cross-sectional dimensions in different parts as required by the automobile manufacturers. Such methods are only capable of a limited production and necessarily the cost of the shafts is considerable.

I have found that die-rolling as herein disclosed is particularly desirable in articles such as axles or other bodies adapted for torsional strains. The die-rolling process gives rise to an unusually fine and compact grain structure and etched sections of articles produced by my process show that the grains adjacent the exterior of the article are disposed in a substantially continuous manner extending longitudinally of the article and closely following the general contour of the blank. The line of the grains changes gradually and toward the center of the bar merges into a grain structure showing lines substantially parallel to the axis of the bar. The absence of spots showing porous grain structure such as are generally found in forged articles of this character is marked.

It is also found by an examination of this character that the grain structure is substantially uniform around the entire article. That is to say, regardless of whether a section through the article is taken in a horizontal plane, a vertical plane or an angular plane referred to the bar as it passes through the die-rolls, the same uniform grain structure with the grains at the peripheral portion closely following the contour of the article and gradually merging into lines substantially parallel to the axis can be found.

The above described arrangement, which is obtainable by a die-rolling operation in a single pass, gives rise to a superior article. The metal is very homogeneous throughout the article and the superior grain structure attained by the use of my process provides a materially stronger article adapted for torsional strains than can be had by the processes heretofore employed.

I have found that I can roll as a long continuous blank a series of such shafts connected either end to end, or by a gating, by first rolling a suitable leader or shape preferably of uniform cross-section and of such dimensions and configuration that a string of blanks can be formed therefrom in a single pass through suitably shaped die rolls.

In Figures 1 and 2 of the drawings I have shown cross-sections of different leaders or shapes adapted for use in accordance with the present invention. These are preferably of uniform cross-sectional area throughout their entire lengths and may be produced by rolling a square billet in any well known manner. It will be apparent that leaders having other shapes may be utilized if desired. In all cases, however, the leaders should have a cross-sectional area at least equal to the largest cross-sectional area at any point in the rolled product. Where the leader is of elongated form in one cross-sectional dimension, its major axis should be slightly larger than the largest cross-sectional dimension of the rolled blank.

When a leader having a major and a minor axis is used it is supplied to the die rolling mill in such manner that the direction of compression is along a long cross-sectional dimension of the leader. The direction of compression is generally along the major axis of the leader but it will be understood, of course, that certain variations from this are permissible. The compression of the leader along a long cross-sectional dimension means that more work is done on the metal with a corresponding increase in the quality of the die rolled article, insures that the matrix portions will completely fill, and reduces the amount of flash.

This leader is passed through a pair of rolls which may have a construction embodying certain of the features disclosed in the patent to George Baehr No. 1,289,602 of December 31, 1918 and other pending applications of said Baehr. In Figure 7 there is shown in cross section a roll 2 suitable for this purpose and comprising a central mandrel 3 carrying die sections 4, which sections may be of any desired dimensions as desired, the assembled sections forming a groove 5 having a bottom 6 conforming to the shape of the particular article to be rolled. This figure illustrates a roll the circumference of which is equal or substantially equal to the length of an individual shaft whereby a shaft blank is formed at each revolution of the roll. It will be apparent, however, that the rolls utilized may be of the type having recurrent patterns whereby two or more complete shafts may be formed at a single revolution. With any form of roll, the blanks will be turned out as a connected series forming a string of blanks which may be sheared apart and the individual shafts thereafter machined, if desired.

In Figure 3 there is illustrated one of the drive shaft blanks as rolled, with part of another, the whole being part of a string of blanks. An individual blank is represented as extending between the dotted shear lines $a$—$a$ and $b$—$b$. This particular shaft is circular at every point throughout its length, the largest portions being indicated at 7 and 8, while between these portions is a reduced portion 9 which is joined to the portions 7 and 8 by fillets 10. Beyond the portion 8 the blank tapers to provide one tapered end 11. Each blank die rolled in accordance with the present invention will have a projecting flash 12 on diametrically opposite sides thereof, the amount of flash varying approximately in accordance with the reducing operation effected by the die rolls.

These strings of blanks may then be taken to any desired point where the sections representing complete units will be sheared apart and cut to length. The flash will be trimmed off and thereafter the shafts may or may not be machined, as desired. If not machined, it will be apparent that the shafts will have a rolled skin throughout the major portion of their lengths.

In Figure 4 there is illustrated a slightly modified form of blank having the enlarged portions $7^a$ and $8^a$ adjacent the ends, and a reduced intermediate portion $9^a$ having the flash $12^a$.

In Figure 5, there is shown another type of shaft wherein the enlarged portion 14 is longer and is located intermediate the end portions 15 and 16. These end portions may obviously be of the same or of different diameters in accordance with specifications. The reduced portions will, however, be provided throughout their length with a flash 17.

In Figure 6, there is illustrated a portion of a series of connected blanks particularly adapted for forming propeller shafts, these blanks having enlarged end portions 18 and a reduced intermediate portion 19, there being a tapered portion 20 beyond one of the enlargements 18 to receive the driving pinion as is customary. This blank will also have a flash 21 adjacent the reduced portions.

Figure 8:
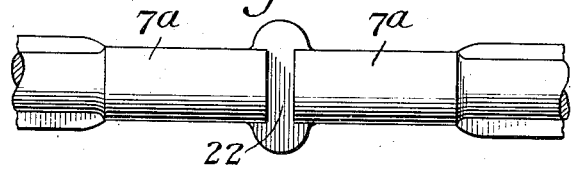
Figure 8 is a detail view illustrating a modified method of connecting adjacent blanks.

In Figure 8 there is illustrated a portion of the adjacent end of each of two blanks having a construction substantially similar to that shown in Figure 4. In this figure the enlarged portions $7^b$ are illustrated as connected by a gating 22. Such a gating is desirable at times, as it permits rolling a blank to length and provides a bite on the blank which is effective during the rolling to prevent slipping of the blank.

The present invention contemplates particularly the formation of articles from ferrous materials. During the die rolling, the roll spring is minimized and the extrusion and spread of the ferrous material is facilitated by reason of the formation of a definitely located flash thereon.

It will be obvious that the sizes of the various portions of the axles or shafts may be varied, as well as their lengths, and other variations may be made without departing from my invention.

The advantages of the invention will be apparent to those skilled in the art, since an inexpensive, rapid and efficient method of making rotary axles or shafts subjected to torsional strains is provided, in which the rolled blanks are all uniform and accurate as to size, length and weight.

It has been found in actual manufacture that the blanks thus die-rolled in a connected tandem series at one operation from a leader of uniform cross section have a substantially uniformly disposed continuous longitudinally extending grain structure following the general contour of the blank throughout the peripheral portions thereof. This grain structure is of a type especially adapted to resist torsional strains to which the axles or shafts finished therefrom are subjected in use. The uniformity of grain structure which exists in any longitudinal section taken through the article is particularly desirable in axles or shafts since there is no weak point from which a crack or other defect may develop. The superiority of axles or shafts so made has been fully proven by actual use. Due to the fact that by my invention blanks can be rolled to substantially finished dimensions within tolerances for the blanks, the finishing operations do not entail the removal of such quantities of the blanks as would result in the rupture or cutting of substantial quantities of the peripheral grains. The finishing operations, therefore, leave the grains in much the same condition as they are in the die-rolled blanks, whereby the finished articles have uniform strength, as far as structure is concerned.

I claim:

1. In the manufacture of shafts adapted for torsional strains, the steps consisting in forming a leader having a major axis and a minor axis, the major axis being slightly larger than the largest portion of the finished shaft, supplying the leader to a die rolling mill in such manner that a long dimension of the leader is compressed during the die rolling operation, and die rolling such leader to form a series of connected blanks each of varying cross sectional area but of substantially circular cross section throughout the major portion thereof, and then severing the blanks, substantially as described.

2. In the manufacture of shafts adapted for torsional strains, the steps consisting in forming a leader having a major axis and a minor axis, supplying the leader to a die rolling mill in such manner that the direction of compression is along a long cross sectional dimension of the leader, and die rolling such leader to form a shaft blank of varying cross sectional area but of circular cross section throughout the major portion thereof, substantially as described.

3. In the manufacture of shafts adapted for torsional strains, the steps consisting in forming a leader having a major axis and a minor axis, supplying the leader to a die rolling mill in such manner that the direction of compression is along a long cross sectional dimension of the leader, then die rolling the leader to form a series of connected blanks each of circular cross section throughout the major portion thereof and then severing the blanks, substantially as described.

4. In the manufacture of shafts adapted for torsional strains, the steps consisting in forming a leader having a major axis and a minor axis, supplying the leader to a die rolling mill in such manner that the direction of compression of the leader in the mill is along a long cross sectional dimension of the leader, and die rolling the leader to form a shaft blank of varying cross sectional area having a flash throughout the major portion of its length, substantially as described.

5. As an article of manufacture, a die rolled blank of changing contour for the production of a rotary article adapted for torsional strains, said blank in any cross section thereof taken perpendicular to the axis of rotation presenting a unitary body of metal substantially symmetrically disposed about said axis of rotation, said blank having a uniform grain structure and disposition of the character obtainable by a die rolling operation in a single pass, substantially as described.

6. As a new article of manufacture, a die-rolled blank adapted for torsional strains when subjected to rotation, the body of said blank being of substantially circular cross-section throughout the major portion of its length and having a changing cross-sectional area, the blank having longitudinal flash zones on its opposite sides for at least a portion of its length, the grain structure of the article near the periphery thereof being substantially uniform around the article, substantially as described.

7. As a new article of manufacture, a die-rolled blank adapted for torsional strains when subjected to rotation, the body of said blank being of subtantially circular cross-section throughout the major portion of its length and having a changing cross-sectional area, the blank having longitudinal flash zones on its opposite sides for at least a portion of its length, the grain structure of the article near the periphery thereof being substantially uniform around the article, and the line of the grains near the periphery substantially following the longitudinal contour of the article, substantially as described.

8. As a new article of manufacture, a die-rolled blank adapted for torsional strains when subjected to rotation, the body of said blank being of substantially circular cross-section throughout the major portion of its length and having a changing cross-sectional area, the blank having longitudinal flash zones on its opposite sides for at least a portion of its length, the grain structure of the article near the periphery thereof being substantially uniform around the article, the line of the grains from the peripheral portions of the article toward the center thereof gradually merging into lines substantially parallel to the axis of the article, substantially as described.

9. As an article of manufacture, a die-rolled blank adapted for torsional strains, the blank being of changing cross-sectional area and being of substantially circular cross-section through the major portion of its length and having diametrically opposite flash zones for at least a portion of its length, the article having a grain structure in peripheral portions thereof which substantially follows the contour of the article, the lines of the grains from the periphery of the article to the center thereof gradually merging into lines substantially parallel to the axis of the article, substantially as described.

10. In the manufacture of bodies of different cross section and at least in part of substantially circular cross section, the steps consisting in forming a leader having a major axis and a minor axis with its major axis larger than the largest portion of the body to be finished therefrom, supplying the leader to a die rolling mill in such manner that the direction of compression of the leader in the mill is along a long cross sectional dimension of the leader, and die rolling the leader to form a series of similarly connected blanks, each of the several blanks having a varying cross sectional area along its length but of substantially circular cross section throughout a portion thereof, and then severing the blanks.

11. In the manufacture of articles of substantially circular but changing cross section, the steps consisting in forming a leader having a major axis and a minor axis, supplying the leader to a die rolling mill in such manner that the direction of compression of the leader in the mill will be along a long cross sectional dimension of the leader, and die rolling the leader to form a blank of changing cross sectional area but of substantially circular cross section throughout a portion thereof.

In testimony whereof I have hereunto set my hand.

WILLIAM P. WITHEROW.